United States Patent [19]
Bieri et al.

[11] 4,385,538
[45] May 31, 1983

[54] SHEARING DEVICE FOR CUTTING BAR-SHAPED STOCK SUCH AS ROLLED STEEL BILLETS

[75] Inventors: Hans Bieri, Pfäffikon; Karl Rimmele, Schmerikon, both of Switzerland

[73] Assignee: Mecapec S.A., Switzerland

[21] Appl. No.: 237,847

[22] Filed: Feb. 24, 1981

[30] Foreign Application Priority Data

Feb. 26, 1980 [DE] Fed. Rep. of Germany ....... 3007099
Apr. 29, 1980 [DE] Fed. Rep. of Germany ....... 3016528

[51] Int. Cl.³ ........................ B23D 15/02; B26D 3/16; B26D 7/02
[52] U.S. Cl. ..................................... 83/169; 83/170; 83/171; 83/196; 83/382; 83/522; 83/584; 83/600; 83/608
[58] Field of Search ................. 83/199, 196, 600, 382, 83/282, 157, 169, 584, 608, 607, 522, 171, 170

[56] References Cited

U.S. PATENT DOCUMENTS

| | | | |
|---|---|---|---|
| 135,609 | 2/1873 | Ward | 83/608 X |
| 1,536,152 | 5/1925 | Schorn | 83/382 X |
| 1,559,082 | 10/1925 | Friederici | 83/600 X |
| 1,559,083 | 10/1925 | Friederici | 83/600 |
| 1,666,316 | 4/1928 | Sparks | 83/608 X |
| 1,803,580 | 5/1931 | Williams | 83/584 X |
| 1,997,311 | 4/1935 | Rose | 83/584 X |
| 2,279,078 | 4/1942 | Swanson | 83/584 X |
| 2,460,842 | 2/1949 | Murphy et al. | 83/584 X |
| 2,779,409 | 1/1957 | Becker | 83/584 |
| 2,869,231 | 1/1959 | Gury, Jr. | 83/169 X |
| 2,939,353 | 6/1960 | Vickers | 83/199 X |
| 3,166,966 | 1/1965 | Ruschmann | 83/169 X |
| 3,233,494 | 2/1966 | Rupp | 83/640 |
| 3,473,427 | 10/1969 | Leibinger | 83/640 X |
| 3,757,627 | 9/1973 | Lange | 83/600 X |
| 3,866,522 | 2/1975 | Oswalt, Jr. | 83/608 X |
| 4,081,007 | 3/1978 | Loigerot | 83/600 X |

*Primary Examiner*—Frank T. Yost
*Attorney, Agent, or Firm*—Yount & Tarolli

[57] ABSTRACT

A shear for cutting bar stock includes upper and lower cutting blade supports each having a cutting blade, and a hold-down member, all pivotally connected about a working bearing. This assembly is pivotally mounted about a second bearing or pivot axis on one end of a frame of the shear, and is height-adjustable by a lockable hydraulic actuator attached to the upper cutting blade support at the opposite end of the shear, to provide vertical adjustability of the cutting point with minimal horizontal or angular displacement thereof. Preferably, the two pivot axes and the cutting point are coplanar. The upper cutting blade support is pivoted relative to the lower one by a hydraulic actuator engaging the upper support at one upper part thereof which is not so coplanar, to provide both a relatively long lever arm and a relatively long cutting arm for minimizing arcuation of the cutting movement. One cutting blade is adjustable within its support for optimum positioning taking into account the shape of the stock. The hold-down member is hydraulically locked into position with the lower (thrusting) cutting blade and moves therewith relative to the upper (contact) cutting blade, providing a three-point support to yield a clean cut.

20 Claims, 10 Drawing Figures

SHEARING DEVICE FOR CUTTING BAR-SHAPED STOCK SUCH AS ROLLED STEEL BILLETS

The invention relates to a device for cutting bar shaped stock, particularly for cutting to length or splitting bar-shaped rolled stock such as steel billets.

Such a device may have a cutting blade support assembly, the assembly comprising two cutting blade supports defining therebetween a cutting panel, said supports being mounted for rotation relative to one another on a working bearing.

A device of the afore-mentioned type for cutting profiled material is described in CH-PS No. 255 171. In this case the shear, with respect to the feed device for the material to be cut, is arranged at a fixed height, whereby one of the cutting blade supports is resiliently supported and with respect to its starting position in relation to the other cutting blade support is adjustably arranged for adjusting to the profiled shape of the goods to be cut; however, it has no substantial height adjustability with respect to the feed device. In any case the arrangement of the axis of the movable cutting blade support according to the special requirements of the cutting process in the inclined direction determines the main profiled surfaces.

When working with shears having pivoting cutting blades, in other words cutting blades which make an arcuate work movement, in the processing of cutting stock with different bar cross sections, especially when directly adjacent to a roller arrangement, there arises the problem of matching the position of the cutting point and therefore the cutting blade as well as the cutting support, with respect to the various different cutting stock dimensions and preferably the different discharge or feed height positions of the cutting stock. The known construction is in need of improvement because with known devices special and awkward to operate means for adjusting the position of the complete shear arrangement are necessary. It is therefore the aim of the invention to provide shears with swivelable cutting blades which through being able to adapt to different dimensions and feed heights of the cutting stock are characterized by their simple operation.

This aim is achieved according to the invention by a device of the aforementioned type wherein said cutting blade support assembly is pivotally mounted about an axis, said axis being arranged offset from the centre of said cutting point, and including means for selectively rotationally positioning said assembly about said axis.

Accordingly the swivel position of the cutting blade support assembly, with a fixed position actuator as the positioning means, allows the required height adjustment through appropriate control of the actuators without substantially interrupting the working, and for all adjustments provides a safe support of the bar section to be cut off with respect to the cutting force. The swivel bearing allows the movable and adjustable arrangement of even bigger shears or cutting blade support arrangements with high precision and at compartatively little extra cost.

According to a particular further development of the invention the cutting blade support movable with respect to the bar feed device or the machine stand is arranged in a swivel bearing displaced with respect to the working bearing. Under the effect of the said positioning means this results in a displacement or height adjustment of both cutting blade supports with a radius of movement which is independent of the choice of the cutting blade support lever arm from the point of view of the cutting technique, i.e. the distance between the cutting point and the working bearing can be measured and increased for keeping small the angular variations of the cutting blades.

An arrangement of the cutting point in the area between the working bearing and the point of attack of the work drive on a cutting blade support or at both supports in the connection has the advantage that a power translating lever arm ratio can be realised through internal bending stresses with relatively little stress of the unit. The cutting force and the bending stresses thus produced in any case remain restricted to this unit and are not transmitted through the machine frame. This explains why the latter is subjected to relatively little stress and can be constructed in a lightweight manner.

In a further development of the invention the cutting point on the one hand and the swivel bearing of the cutting blade support arrangement on the other hand with respect to the working bearing are arranged at least approximately opposite each other. This has certain special advantages regarding the cutting process or with regard to the positional adaptability of the cutting blade for different heights of the cutting stock in the following manner.

At the start of a cutting process it is essential for the smooth running of the cutting process that there is generally a smooth contact between the cutting blade edge and the profiled surface of the cutting stock. This applies in particular also with regard to the often required slight displacement or forcibly moved bar-shaped cutting stock in the direction transverse to the bar axis. In the case of relatively simple profiled shapes, for example quadratic or rectangular billet cross-sections, this can usually be achieved with the aid of upper and lower cutting blades adapted to the cross sectional shape. In the case of swivelable cutting blade supports and a corresponding circular movement of the cutting blades in shears of the present type, the even contact of the cutting blade edges however initially only applies for a specific angular position of the two cutting blade supports, i.e. for a specific height of the cutting stock, whereas for other cross sectional heights angular deviations between the cutting blade edges and profiled surfaces arise only at the start of cutting. This also applies to a working method of the shears whereby at first one of the cutting blades, for example the upper blade, has its cutting edges brought into contact with the profiled surface and during the subsequent cutting process maintains a fixed position with respect to the machine stand or with respect to the bar feed device, whereas the other cutting blade, for example the lower blade, effects the actual cutting thrust. The first cutting blade is known as the contact blade and the second as the thrust blade. In other words the first one already prior to the cutting process takes up its angular position which at the start of cutting is unchanged, whereas the latter during the thrusting movement follows through from the angular position which was effective at the start of cutting.

In any event each case requires a very precise contact or angular matching between the cutting blade edges and the profiled surfaces at the start of cutting. In the case of the present swivel cutting blade supports this can be achieved completely by a cutting blade adjustment relative to a support in such a manner that the angular adjustments of the cutting blade supports remain unchanged independent of the cutting stock profile height. Further developments of the invention based upon this are described in more detail further below. In any case the slightest possible change in the angular position of the cutting blade edges with respect to the different profile heights at start of cutting is desired.

The latter is achieved by the aforementioned diametrical arrangement of the cutting point on the one hand and the swivel bearing of the cutting blade support arrangement on the other hand, and for the following reasons:

In the case of the aforementioned maximum interval of the respective outer swivel axis, which essentially corresponds to a pre-arranged total machine width, in comparison to other types of axial arrangements this results in a larger axial interval between the swivel bearing of the cutting blade support arrangement on the one hand and the cutting point on the other hand, i.e. a relatively large radius for the circular adjusting movement of the contact blade for contacting the profile of the cutting stock and apart from that this results in a smaller variation at the start of cutting in the angular position of the thrusting blade in relation to the contact blade and thus also in relation to the cutting stock profile because for a given change in height profile the corresponding adjustment of the working bearing axis is relatively small.

According to a further preferred embodiment of the invention it is intended that the swivel/fixed position actuator of the cutting blade support arrangement engages at a point in the cutting blade arrangement which relative to the cutting point is arranged at least approximately opposite to the working bearing. This results in an optimum use of the available machine widths for the generally aimed at larger size of the effective lever arm for the swivel/fixed position actuator.

In another preferred embodiment of the invention the cutting blade supports preferably arranged directly adjacent to one another through a working bearing are rotatably interconnected and supported by the axial components of the cutting force effective in the longitudinal direction of the bar during cutting. This enables the cutting blade to be constructed free of play and with smooth working capability. Preferably the working bearing of the cutting blade support is provided as the axial pressure bearing for taking these axial components.

For ensuring sufficient play between the cutting blades even under heavy load there may, if necessary, be provided a compression spring tilting mechanism acting against the axial cutting blade separation by the cutting blades with respect to each other, whereby, suitable drops are provided for maintaining the required axial minimum gap in the cutting blade edges. However, this pre-tension must always be greater than the maximum axial component of the cutting forces which appear in the cutting direction.

In contrast to this, however, a substantial further development of the invention is designed to overcome this dependence by the pre-tension forces on the cutting pressure and its axial components acting in the cutting blade cutting direction. Contrary to the aforementioned solution this is achieved by providing a compression spring tilting mechanism for tilting the cutting blades relative to each other in the direction of the cutting blade separating direction. Suitable stops for limiting the axial cutting blade separation in this case also can ensure the maintenance of the required cutting blade gap in a simple manner. A particular advantage of this embodiment comprises in the fact that the axial cutting force components are picked up by the stop means constructed in a simple and robust manner, while the pre-tensioning can be of substantially smaller size, which results in a simplification of the associated elastic or fluid pressurising means.

A further development of the invention relates to a hold-down member, and for this is envisaged a connection with the swivelable cutting blade support arrangement as well as taking part in its preparation or working movement. Such an embodiment has the advantage that for holding down during cutting no continuous energy supply for driving the hold-down member is required, while the hold-down member on the other hand can participate in an adjusting movement for adapting to different cutting stock feed relationships in a particularly simple manner through its drive connected with the cutting blade support. In the interest of a simple and robust construction the hold-down member is preferably mounted coaxially to the working bearing of the cutting blade support arrangement, preferably on a common axial body.

The shear device construction according to the invention furthermore permits in a particularly advantageous manner the arrangement of a hold-down member for the bar section to be cut off. Such a hold-down member is known to be essential for the quality of a cut, especially when cutting relatively short sections of bar. For this purpose according to a further development of the invention a hold-down member is provided which is coupled to a cutting blade support for effecting a cutting-work movement in relation to the machine stand or a bar feed device. This coupling of the hold-down member with a thrusting blade facilitates a smooth support during the cutting process. It is thus particularly advantageous to connect the hold-down member with the associated cutting blade support through a fixed position actuator. This enables in a particularly simple manner the adjustment of the hold-down member with respect to cutting stock of different shape. Preferably the fixed position actuator is provided with a back stop which allows the pressure as a result of the cutting thrust to be picked up independently of the feed force of the hold-down member drive and in a simple manner supports the hold-down member against the cutting force thrust.

The embodiment of the shear device according to the invention provided with hold-down members of the aforementioned type furthermore, with relatively little expense, permits a support of the bar sections to be cut off right up to the immediate area of the cutting point. For this purpose the hold-down member is provided with a pressure member extending in a direction parallel to the longitudinal direction of the bar at least partly over the width of the adjacent cutting blade support and extending counter to the cutting plane. Such a construction of the hold-down member arranged outside the cutting zones results in a certain amount of torsion as a result of the cutting forces acting on the laterally protruding pressure member. However, these forces acting on the hold-down member can be absorbed, especially in the present construction, without difficulty by the pivoting cutting blade supports and the correspondingly pivoting hold-down member. This also applies particularly for the swivel bearing of the hold-down member.

The aim of the invention furthermore extends to the creation of an operating method for the shears according to the invention which is characterized by the automatic adjustment to different work piece shapes and feed relationships at a high rate of operating safety and also at a high speed. According to the invention this is achieved by a method comprising the steps of (a) feeding a bar section to be cut through a cutting point in the area between two cooperating cutting blades;

(b) setting into motion a cutting blade support carrying an associated cutting blade to bring said blade into contact with the bar on one side;

(c) positioning a hold-down member against the bar on the same side as the cutting blade;

(d) moving the second cutting blade support and an associated cutting blade into a contact position with the bar on the other side of the bar;

(e) locking the hold-down member in position relative to the second cutting blade;

(f) cutting the bar with the hold-down member in the fixed position relative to the second blade; and (g) raising the holding down member from the separated bar section, picking up the bar on a carrier device and subsequently removing the bar from the device.

Essential for such a method is a means for automatically ensuring the positioning of the bar section to be cut off by placing the cutting blades against opposite sides of the bar cross section while at the same time placing the hold-down member against the bar section. Accordingly the latter is safely supported against the cutting forces with a three point contact after which the hold-down member is locked in its contact position with respect to the associated cutting blade supports. The hold-down member can therefore take part in the subsequent cutting movements without forfeiting the safe support of the bar section. This results in the desired, self-operating and secure retaining of the bar section to be cut off.

Further features and advantages of the invention will be described with the aid of the embodiment examples illustrated by the drawings. These show.

Figure 1:
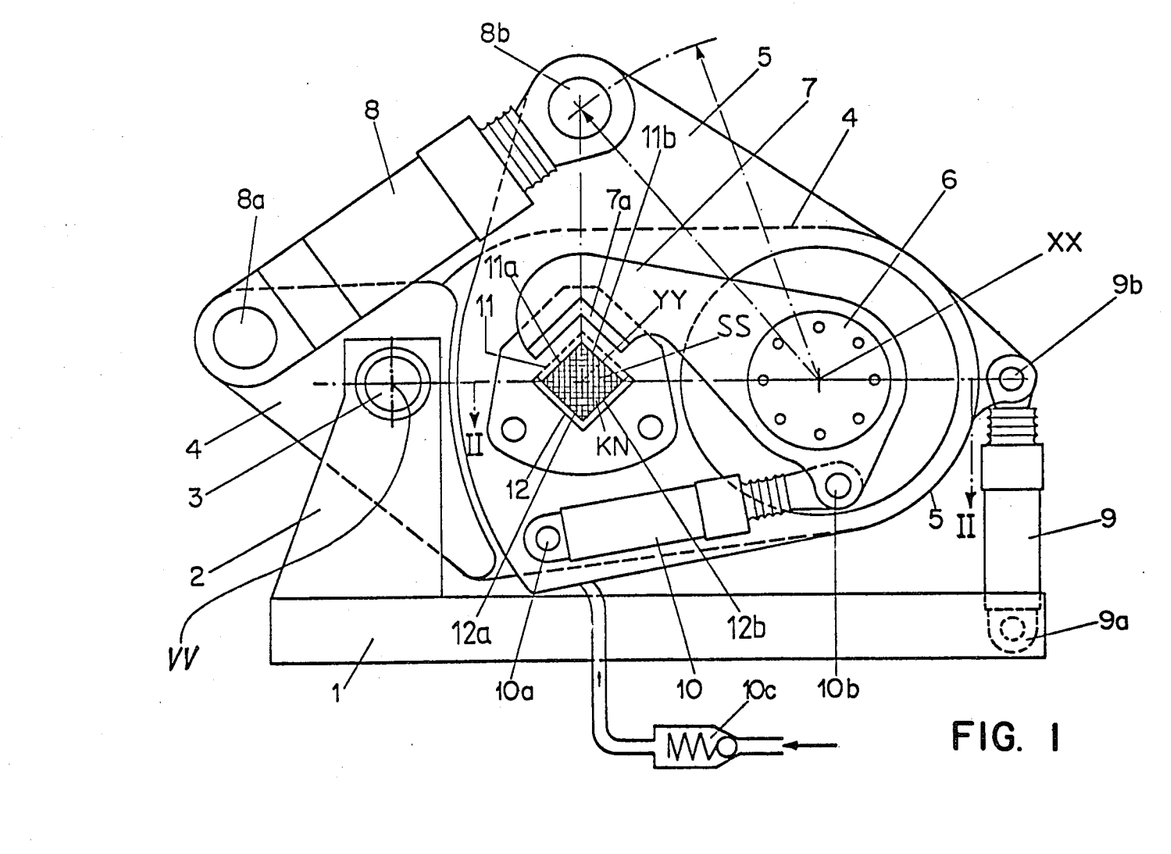
FIG. 1. A schematic view of a billet shearing device according to the invention as seen in the direction parallel to the longitudinal direction of the bar shaped cutting stock.

FIG. 1 shows the machine room comprising a base plate 1 with a main bearing block 2 on which a first cutting blade support 4 is movably mounted by means of a swivel bearing 3 allowing pivoting of the support in a vertical plane about the horizontal axis VV. Adjacent the first cutting blade support 4 is mounted a second cutting blade support 5 similarly mounted for swivel movement in a vertical plane by means of a bearing 6 having a horizontal axis XX, and connecting the two cutting blade supports, the power bearing being arranged in the form of a robust axial pressure bearing. The construction of this bearing will be described in detail later with the aid of FIG. 2. The cutting blade supports 4 and 5 together with the bearing 6 form a unit previously described as the cutting blade support arrangement and which pivots about the bearing 3.

In the area between the bearing 6 and the swivel bearing 3 there is arranged a cutting point SS, through the centre of which extends the bar axis YY of the cutting stock. At this point the two cutting blade supports have recesses for receiving the bar shaped cutting stock in the form of for example rectangular billets KN. The cutting point SS is defined by two annular cutting blades 11 and 12 mounted on the two cutting blade supports, the first cutting blade 11 being seated on the cutting blade support 4 and having a contact blade which engages the billet from above and the other cutting blade 12 being seated on the cutting blade support 5 and having a thrusting blade which engages the billet from below. Each cutting blade has two cutting edges $11a$, $11b$, $12a$, and $12b$ arranged at right angles to each other and which cutting edges are arranged with respect to the cross-sectional sides of the billet and during the cutting movement engage the workpiece surface at an angle of approximately 45°.

The working movement of the two cutting blade supports relative to each other is effected by means of a drive means 8 in the form of a double acting fluid cylinder and piston whose ends $8a$ and $8b$ engage directly with the cutting blade supports. To move the cutting blade support arrangement about the axis VV there is provided a fixed position actuator 9 which is also formed by a double acting fluid cylinder and piston.

A further advantageous feature of the construction shown in FIG. 1 lies in the fact that the swivel bearing 3 of the cutting blade support 4 is arranged at least approximately in line with the cutting point and the axis XX of the bearing 6. In this way despite a relatively small distance between the pivot bearing 3 and the axis YY, during height adjustment only very slight additional horizontal displacements of the cutting point take place.

It is a further advantage that the fixed position actuator 9 engages with an arm $9b$ at a position on the cutting blade support which, relative to the cutting point SS, is arranged on the opposite side of the bearing 6 or the pivot bearing 3. This results in a comparatively slight load on the actuator 9 by the weight of the pivoting unit and a high degree of adjustment precision with relatively long thrusts of the actuator 9.

As can be seen from FIG. 1 the shears are provided with a hold-down member 7 for supporting the billet section to be cut off against the cutting forces. The hold-down member has a gripper $7a$ adapted to match the billet cross-section and which engages the same side of the billet as the cutting blade 11, i.e. in the opposite direction to cutting blade 12 and accordingly with respect to FIG. 1 is arranged on the forward side of the cutting blade support unit so as to result in a three point support against the cutting forces. The hold-down member is mounted co-axial with the bearing 6 to pivot about the axis XX, and is provided with an actuator 10 in the form of a double acting fluid cylinder and piston. By means of arms 10a and 10b the latter engages the cutting blade support 5 on the one hand and the hold-down member 7 on the other hand, thus the hold-down member and the actuator 10 are included in the cutting blade support unit and therefore take part in the adjustment movement of the contact blade, i.e. the cutting blade support 4. Actuator 10 advances the hold-down member to the billet.

Actuator 10 is furthermore provided with a back stop 10c in the form of a back pressure valve for its fluid drive means so that the gripper 7a after contacting the billet through a pre-arranged pressure is locked in a fixed position relative to the cutting blade support 5 and therefore subsequently takes part in the working movement of the thrusting blade. For removing the cut off bar section after completion of the cut the return stop 10c is (released in a manner not shown in any further detail) and the hold-down member can be raised onto its starting position with respect to the cutting blade support 5 by a complimentary operation of the actuator 10. (the corresponding pressure medium supply and control are likewise not shown as it customary).

Figure 2:
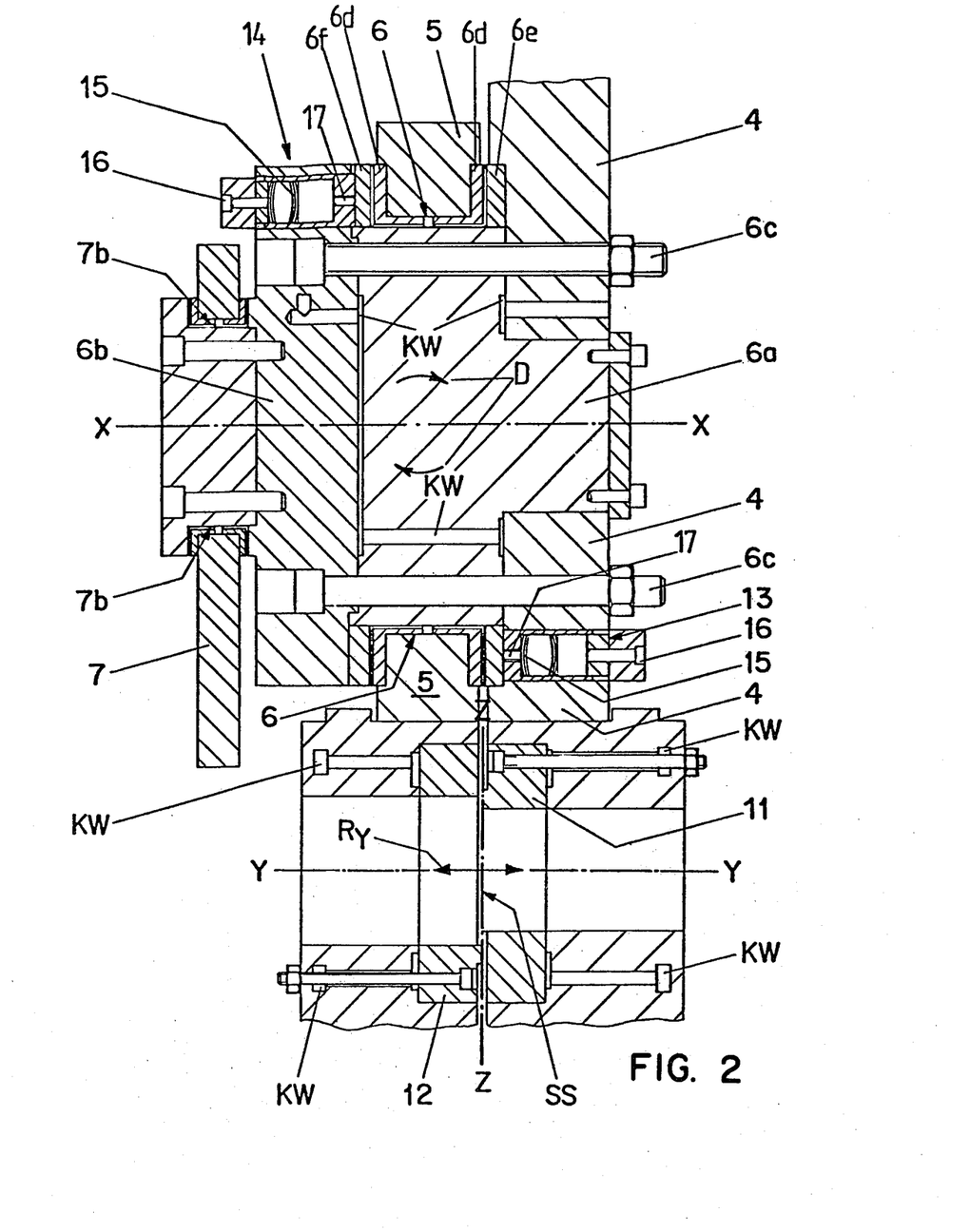
FIG. 2. A partial section of the device according to FIG. 1 along the cutting plane II—II.

As can be seen from FIG. 2 the cutting blade supports 4 and 5 are connected by means of bearing 6 and arranged directly adjacent to each other along axis YY in the area of the cutting point SS. The axial component Ry of the bending forces resulting from the cutting force effective in the direction of the axis YY in the sense of a complimentary separation of the cutting blades 11 and 12 is thus kept relatively low within the cutting blade support unit. The cutting blade supports generally are supported against these axial cutting force components by the bearing 6. For keeping low any additional separating forces and corresponding bending forces, the points of connection of the power drive 8 on the cutting blade supports 4 and 5 are provided by arranging the ends 8a and 8b approximately along the line ZZ indicated in FIG. 2.

The construction of the thrust bearing 6 can also be seen in detail from FIG. 2. For this a compact axial body 6a with an axial shoulder arranged concentrically to the axis XX is fitted into a corresponding bore in the cutting blade support 4 and connected to a pressure plate 6b by means of bolts 6c connected under tension between the pressure plate and the cutting blade support 4. On the periphery of the axial body 6a there are seated bearing boxes 6d supporting the cutting blade support 5. These bearing boxes are provided with large area facing flanges on their external axial ends which cooperate with corresponding end journal bearing discs 6e, 6f on the side of the cutting blade support 4 and the pressure plate 6b.

To take up any slackness between the bearing 6 or the cutting blade support 5 and the cutting blade support 4 there is provide a compression spring tilting mechanism which comprises two diametrically opposed pressing devices 13 and 14 acting parallel to the axis XX and spaced radially from this axis. Under the effect of these pressing devices the cutting blade support 5 is pivoted in the direction of the pair of curved arrows D as shown in FIG. 2 until the corresponding bearing surfaces of the front flanges or front discs 6d and 6e abut against each other.

These bearing surfaces thus act as stops for limiting swivel movement in the direction of a cutting blade separation. Through appropriate axial thickness measurements the axial bodies 6a and corresponding axial positioning of the pressure plate 6b it is thus possible to very accurately and securely adjust the required axial play between the cutting blades 11 and 12. As already mentioned in the introduction, the pressure devices only have to supply a relatively small force while the cutting forces are absorbed by the larger axial bearing surfaces.

The pressing devices 13 and 14 in the example each have a stack of plate springs 15 with a pre-tension adjustment screw 16 which acts parallel to the axis XX and transmits the appropriately adjusted pre-tension force through a plunger 17 to the respective oppositely arranged front bearing disc 6e and 6f and thus through the associated front flange 6d of the bearing 6 to the cutting blade support 5 in the direction of arrows D.

Figure 10:
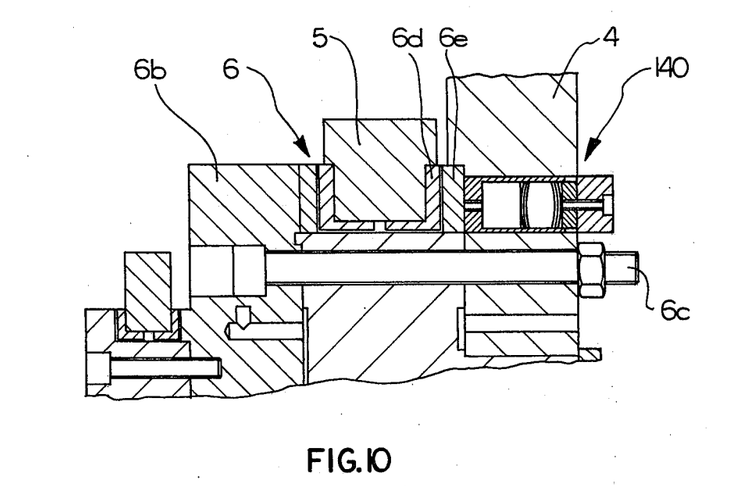
FIG. 10, a partial section similar to FIG. 2.

If a pre-tensioning pivot movement acting against the axial cutting blade separation is to be utilized this can be done with a suitable arrangement. To achieve this the pressing devices 13 and 14 and be arranged on the opposite sides of the cutting blade support 5 to those shown in the arrangement according to FIG. 2, this resulting in a pivot movement in the opposite direction to the arrows D. Such an arrangement is shown in FIG. 10, wherein the pretensioning device 140, along with a similar device (not shown) located on the opposite side of the lower cutting blade support 5 and diametrically opposite the device 140 about the working bearing 6 acts to resist axial separation of the cutting blades. Again, stop means maintain a minimum axial separation.

As can be seen from FIG. 2 the compact arrangement of the cutting blade supports and the working bearing in a sealed unit makes it easier to construct a system of cooling channels provided for cooling the shears, particularly the cutting blades 11 and 12, but also for the adjacent thrust bearing 6. In FIG. 2 there are shown cooling channels KW enabling the cutting blades 11 and 12 as well as the axial body 6a and the pressure plate 6b to be directly subjected to a cooling agent without requiring substantial external cooling agent pipes and connections which may be prone to breakdown.

The above mentioned robust construction of the cutting blade support unit and especially the working bearing in connection with the adjustment for play or the support against the cutting blade separating forces permits heavy cutting operations with large cutting forces to be carried out in a relatively lightweight and space saving machine stand. In addition it is also possible to apply relatively large force translations within the cutting blade support arrangement with the appropriate lever arm ratio.

The compact and rigid embodiment of the shears is not only due to the inclusion of the drive means 8 in the cutting blade support unit, but also the arrangement as seen in FIG. 1 of the axis XX of the bearing 6, the cutting point SS and the end 8a of the drive means 8 in one plane. Not only does such an arrangement provide the shortest possible bending arm lengths within the unit, but also leads to a reduction in the pivot and torque forces within the cutting blade supports of the unit, whereby the stresses effective inside the unit are essentially absorbed by the bearing 6. The present construction therefore also comparatively reduces the stress on the working bearing which in turn is of advantage to the inclusion as shown in FIG. 2 of the pivot bearing 7b of the hold-down member 7 within the unit.

Figure 3:
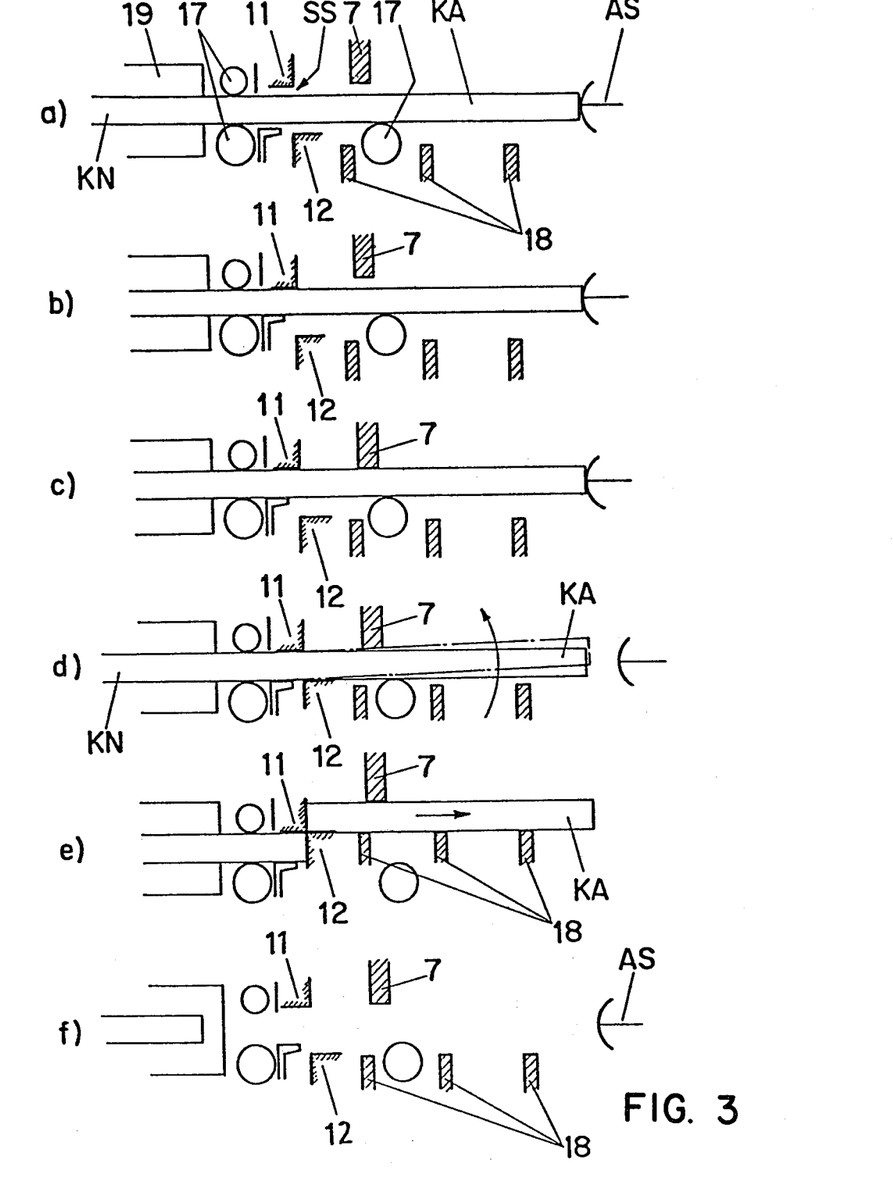
FIG. 3. A flow chart of the working method according to the invention in consecutive stages (a) to (f), whereby each of these work stages is represented in a correspondingly referred to line of FIG. 3.

The operation of the shears shown in FIGS. 1 and 2 will now be explained in more detail with the aid of FIGS. 3a to f.

First of all, as shown in FIG. 3a from a feed device 19, for example the output station of a hot-rolling mill, a billet section KA to be cut is advanced through the cutting point SS by means of transport and support roller 17 between the opened cutting blades 11 and 12, and to determine its length it is pushed against a stop AS. Then, as shown in FIG. 3b, by means of appropriate controls the contact blade 11 on the opposite side of the roller 17 is brought with contact with the billet. FIG. 3c shows the hold-down member 7 being placed against the billet section KA on the same side as the contact blade 11 shows the working movement of the thrust blade 12 as it is pushed upwards from the opposite side to the holding down member 7. Up to the start of the cutting process i.e. until the cutting blade 12 contacts the billet, the hold-down member is displaced relative to the cutting blade support 5 in a counter clockwise manner as shown in FIG. 1 and held on the billet initially by the actuator 10. Subsequently, the hold-down member participates in the cutting movement of the cutting blade 12 and is supported against the billet by the back stop (see FIG. 3e). After that, as shown in FIG. 3f, the back stop is removed and the hold-down member is raised from the billet which is removed from the shears by means of a gripper 18.

Figure 4:
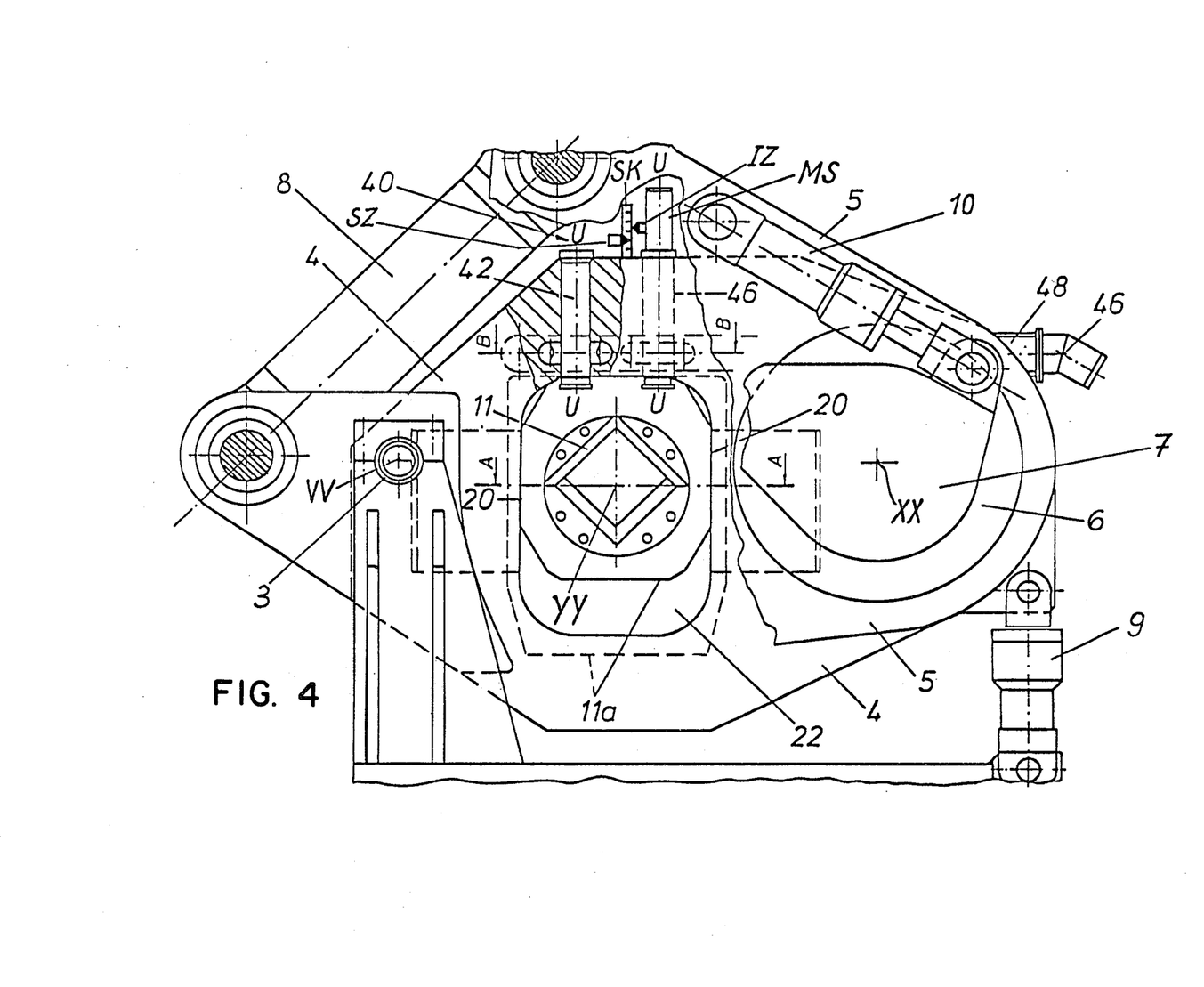
FIG. 4. A side elevation of another embodiment of the device according to the invention with a view parallel to the axis of the bar shaped cutting stock.

The shear assembly shown in FIGS. 4 to 7 works as follows (duplicate elements are designated with same references as in the previous drawings and are not explained again in any detail):

As shown in FIG. 4 the contact blade 11 with an associated cutting blade holder 11a (the section of the cutting blade support 5 containing the thrust blade 12 is represented here with its position adjusting device exposed) so as not to obstruct the view of the cutting blade 11 is displaceably mounted in guide surfaces 20 of a recess 22 of the cutting blade support 4 for movement generally in a vertical direction. Accordingly, with regard to its starting position on the upper side of the billet thus cutting blade can be moved into an area which corresponds to the various profiles or cross-sectional heights of the cutting stock. The bar-shaped cutting stock is hereby conveyed with its under side on a fixed feed device. The bar axis YY and the upper side of the cutting stock with different cross sectional heights therefore take up different vertical positions with respect to the machine stand. Accordingly the cutting blade 11 has to take up different starting positions for the cutting process.

For suitable adjustment of the starting position of the cutting blade 11, in the case of different cross-sectional heights, basically a corresponding control of the fixed position actuator 9 is not used. However, it is particularly advantageous in the present example that the cutting blade 11 is given its own position adjustment within the cutting blade support 4. The fixed position actuator 9 and therefore the cutting blade support 4 themselves can then maintain an unaltered starting position for the various cutting stock cross-sections. This not only has the advantage of an unaltered starting position of the counter-blade 12 with respect to the fixed position of the cutting stock underside and thus the advantage of a relatively simple control of the power drive, but also simplifies the control of the fixed position actuator 9. This also simplifies the carrying out of additional functions by the actuator 9, for example by additional comparatively shorter thrusting movements by the cutting blade 11 during the successive cutting processes for the pushing through of a new bar section to be cut.

For the relative displacement of the cutting blade 11 with respect to the cutting blade support 4 there is provided an adjusting device 40 which on the one hand engages the cutting blade support 4 and on the other hand connects to the cutting blade holder 11a. This adjusting device comprises two uniformly driven adjusting members 42 and 46 in the form of helical drives with threaded spindles 43 or 47, their axes UU extending essentially parallel to the work movement, i.e. vertically. The members 42 and 46 are mounted for axial displacement in corresponding guide drillings in the upper part of the cutting blade support 4. On each threaded spindle there is seated a nut 43a or 47a with its outer circumference in the form of a worm gear. These nuts are rotatable but mounted in corresponding recesses of the cutting blade support 4 and secured against axial displacement so that rotation of these nuts results in a longitudinal displacement of the threaded spindles and thus a corresponding displacement of the cutting blade holder 11a in its guide within the cutting blade support 4.

The axes UU of the two adjusting members 42 and 46 are spaced apart on opposite sides of the vertical centre plane of the cutting axis. The already mentioned uniform drive of the two helical drives therefore has the result that the cutting blade holder 11a is secured against unintentional tilting during the adjusting movement independent of its guide means along the surfaces 20 of the cutting blade support 4. Uniform driving of the helical worm drives, as can be seen from FIG. 7, is achieved by coupling the two helical screw drives with a uniform operating member 48 in the form of an adjusting shaft which in turn engages with the worm gears on the circumferences of the nuts 42 and 46 through matching worm gear sections 44 and 45.

Figure 7:
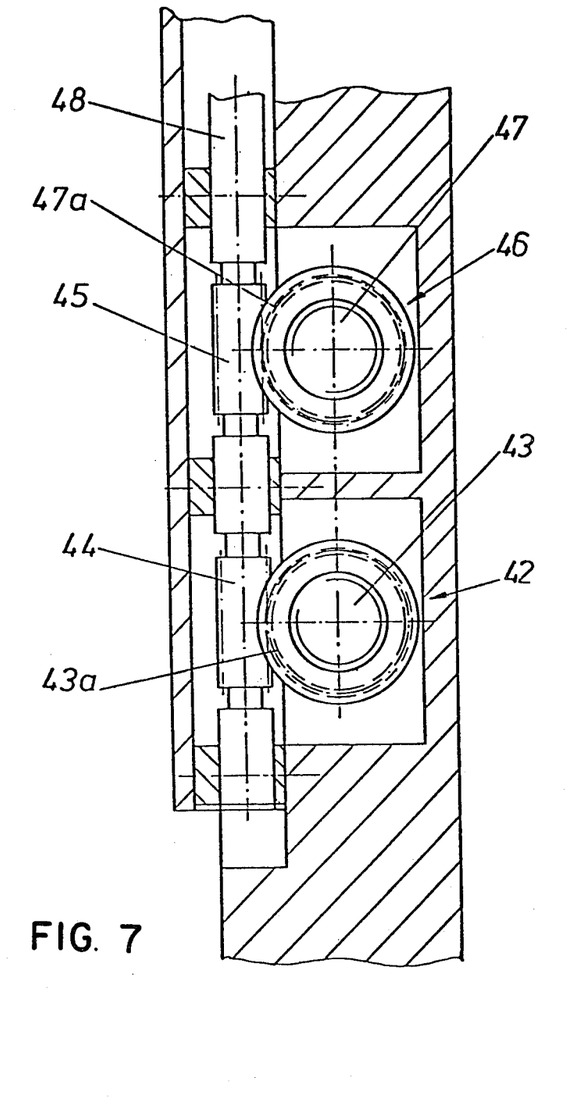
FIG. 7. A partial section according to line B—B in FIG. 4, on a scale according to FIG. 6.

The operating member can be driven by hand or—according to FIG. 7 for example through a universal joint 46'—by means of a servo motor (not shown) or similar device in the sense of a subordinated programme control.

Figure 5:
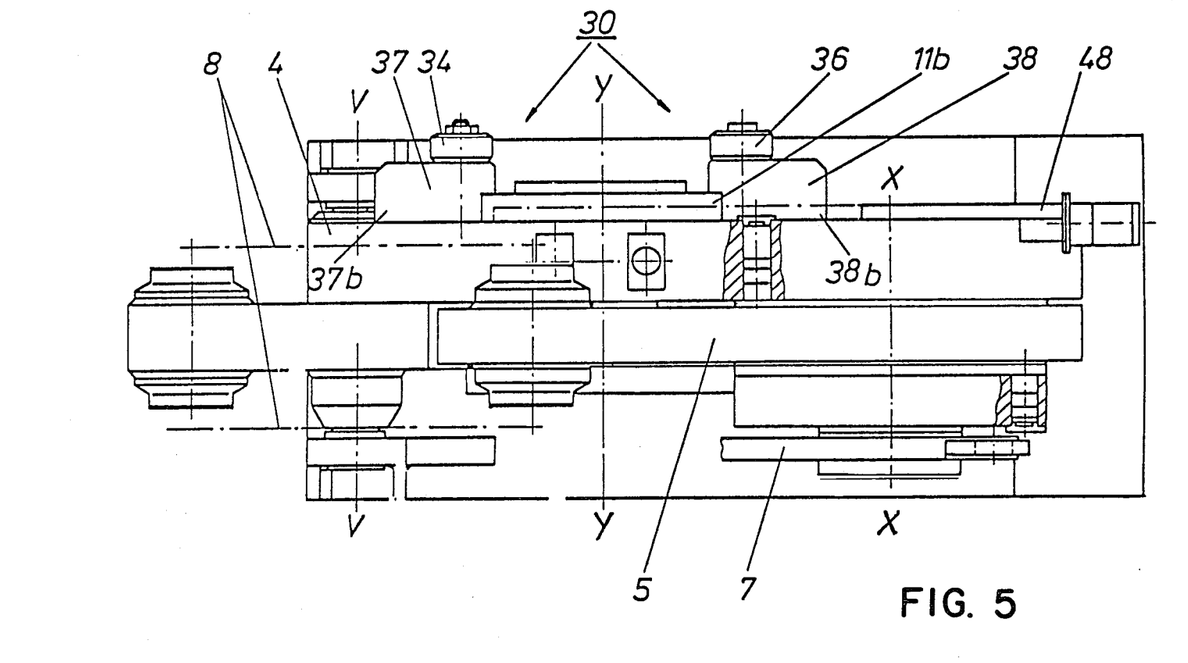
FIG. 5. A plan view of the shears according to FIG. 4.
Figure 6:
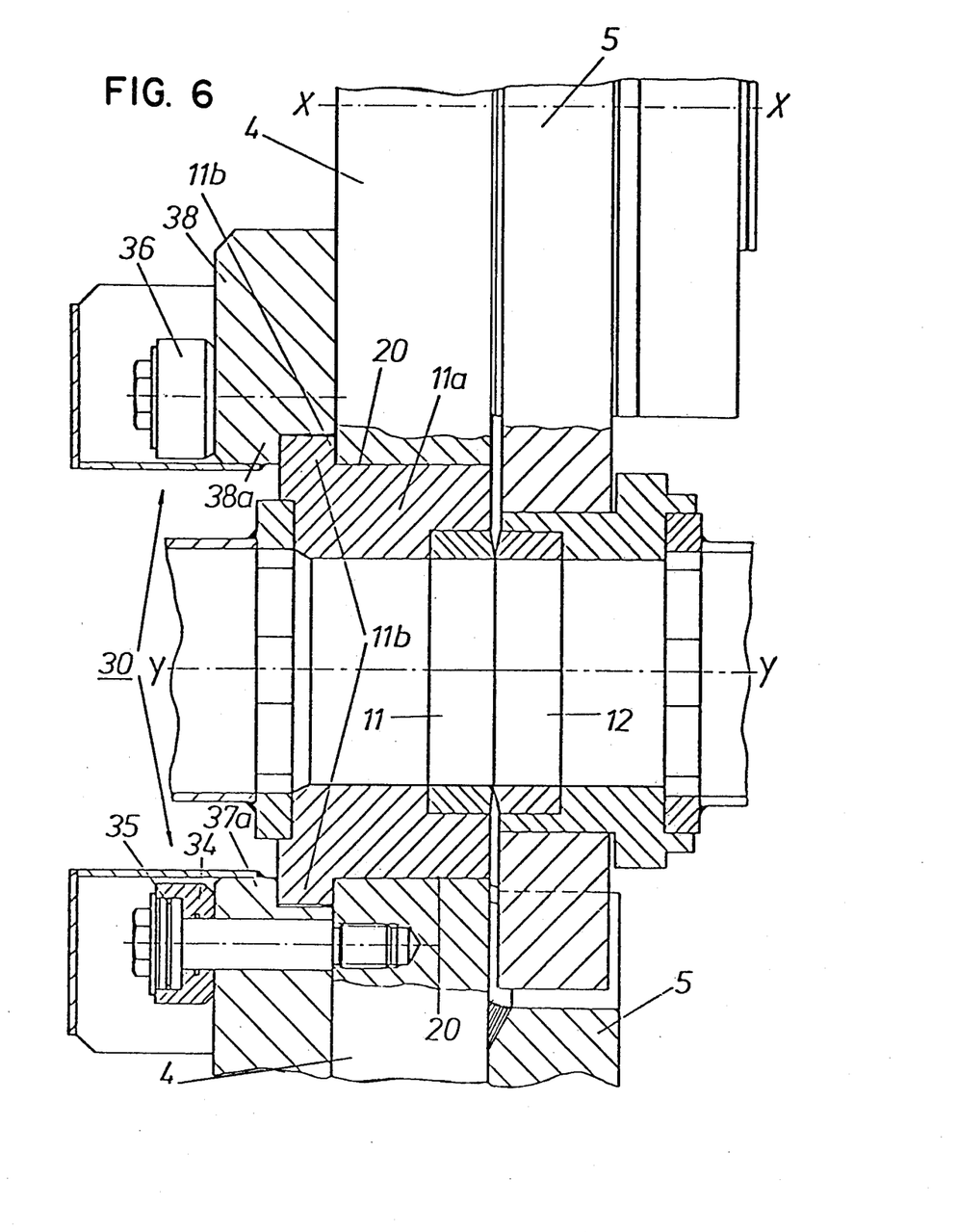
FIG. 6. A partial axial cross-section along line A—A in FIG. 4 and on a larger scale.

In the operating condition the cutting blade holder 11a is retained in the adjusted starting position of the cutting blade 11 by means of a clamping device 30, the detailed construction of which can be seen in FIGS. 5 and 6 (in FIG. 5 the hydraulic cylinder and the power drive 3 are indicated only by broken lines for the sake of clarity.).

The clamping device 30 comprises two clamping members 34 and 36 in the form of hydraulic cylinders for limited thrust which, as can be seen from FIG. 6, are arranged diametrically on opposite sides of the recess 22 of the cutting blade support 4, in fact at the back of the same. In FIG. 6 the construction of the clamping member 34 is shown in cross-section. The piston 35 of the cylinder is mounted at the head of a spacer bolt 35a which is screwed into the cutting blade support 4 and extends through a bore in a clamping jaw 37. A corresponding arrangement with clamping jaw 38 is provided for the clamping member 36. The clamping jaws are pressed against the rear side of the cutting blade support 4 by means of compressed air of pressure release through pipes and control valves not shown. During the pressing movement the internally protruding shoulders 37a or 38a of the clamping jaws engage against a rearward collar 11b on the cutting blade support 11a and positively lock this on the cutting blade support 4. This support ensures the safe absorption of the considerable transverse cutting forces.

In the embodiment of FIGS. 4 to 7, there is additionally provided for the adjusting movement of the cutting blade 11 in relation to the associated cutting support 4, an adjusting gauge device MS which for example is connected with the threaded spindle of the adjusting member 46 and comprises an indicator device with an adjusting "actual value" indicator IZ as well as an associated adjusting scale SK. The scale furthermore has an adjustable nominal value indicator SZ by means of which it is possible for a specific profile height to select a suitable height adjustment of the cutting blade with respect to the cutting blade support. It may also be useful by means of the usual contact members or adjusting difference measuring members for ascertaining the particular adjusting differences between the actual value indicator and the nominal value indicator as well as by means of suitable, likewise known control means to form an adjustment control circuit by feedback to the adjusting drive. With such a control device it is possible automatically to achieve a pre-selected cutting blade adjustment.

Figure 8:
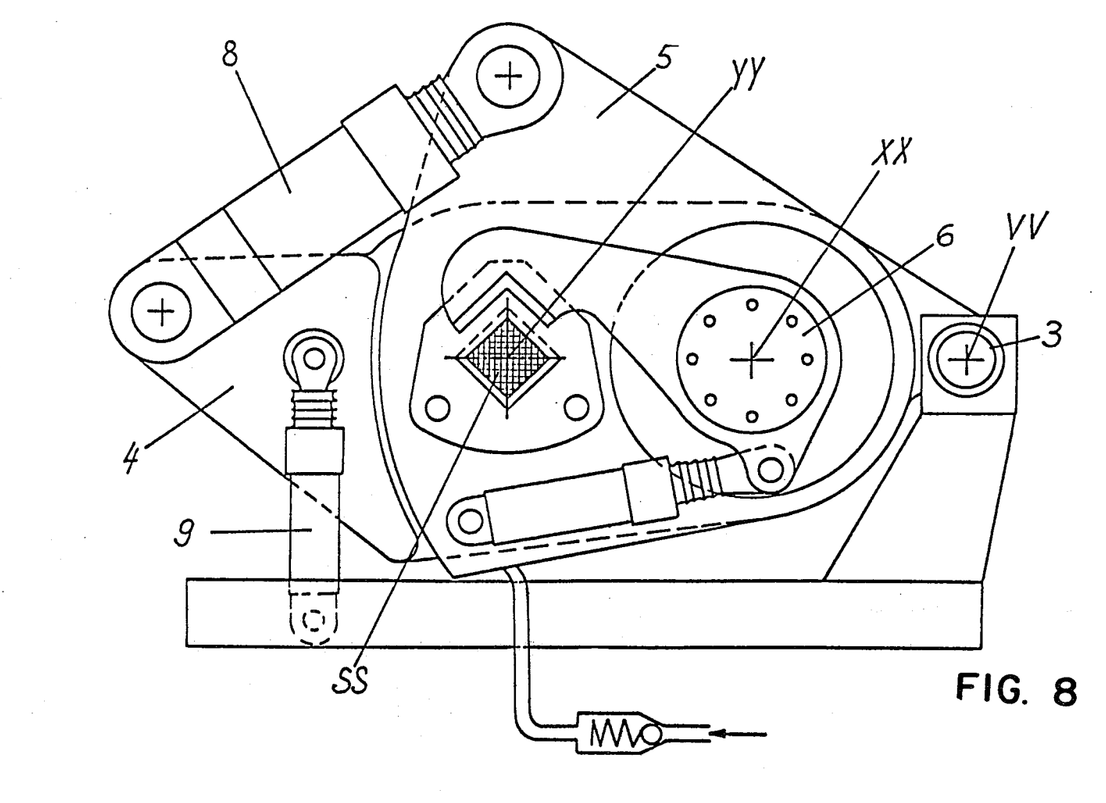
FIG. 8. A side elevation of a device according to the invention with special swivel axis arrangement.

The embodiment of the invention shown in FIG. 8 is substantially similar to that shown in FIG. 1, however it is characterized by a special type of arrangement. The cutting point SS on the one hand and the swivel bearing 3 of the unit comprising the cutting blade support 4 and 5 on the other hand are arranged on opposite sides of the thrust bearing 6. As already mentioned in general in the introduction this results in a relatively large space between the swivel bearing 3 and cutting point SS, i.e. a relatively large radius of the circular displacement of the cutting blade edges. The drawing further shows that for a given cutting blade-adjusting stroke the associated adjusting stroke of the axis XX of the bearing 6 is substantially reduced in comparison to the embodiments shown in FIGS. 1 and 4. This results in the aforesaid reduction in the change of angle of the cutting blade edges during the adjustment for the various profile heights of the cutting stock, so that, if necessary, a cutting blade adjustment with respect to the cutting blade support may be dispensed with.

In this embodiment too the swivel axis VV of the cutting blade support arrangement is arranged offset from the axis XX so that the radial distance between the axis VV and SS in the sense of the aforesaid linearisation of the circular adjusting movement can be selected independently of the lever arm of the cutting blade support, i.e. the distance of the axis XX and YY within the context of the width of the machine provided.

Figure 9:
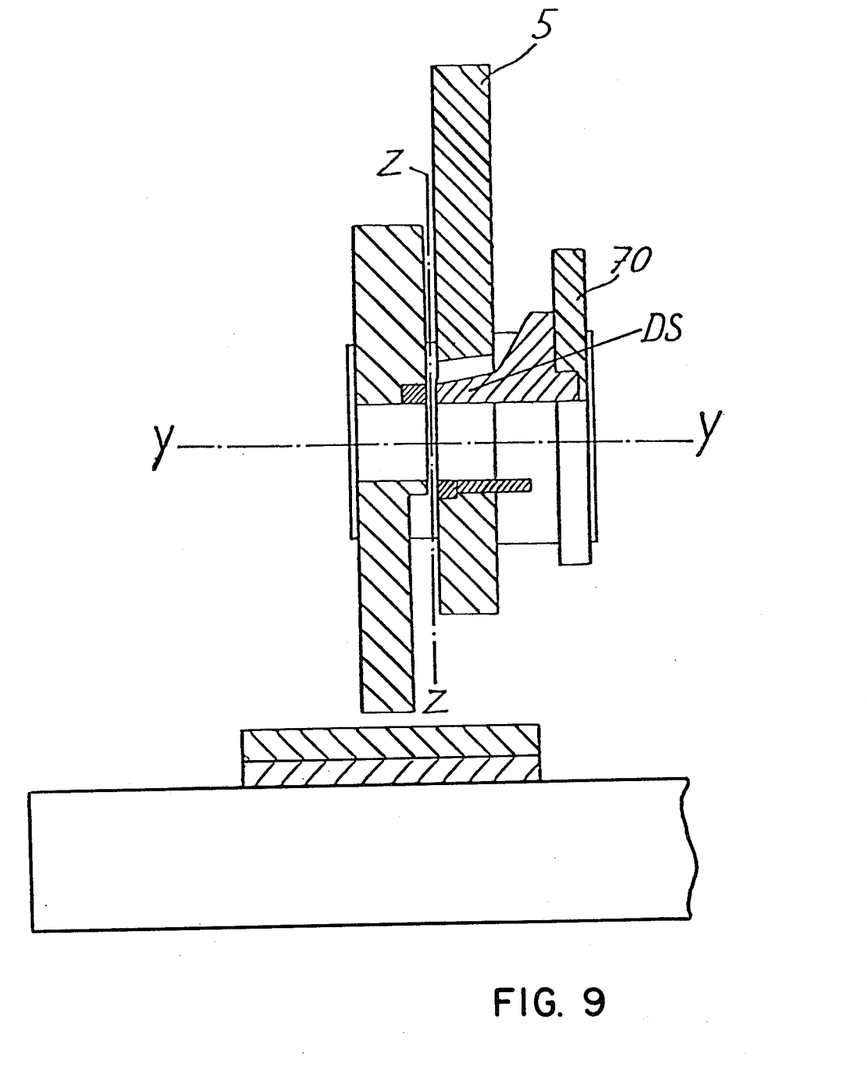
FIG. 9. A schematic section of the shears according to the invention with a specially constructed hold-down member with vertical sectional plane through the bar axis of the cutting stock.

In FIG. 9 likewise there is shown the shears with a hold-down member 70 engaging in the cutting zone as already described in the introduction. The latter for example as shown in the embodiment in FIG. 1 is arranged co-axially to the axis XX of the bearing 6 and together with this is mounted on a common axial body. As a result, the torsional stresses appearing in the hold-down member 70 can be readily absorbed by the pressure member DS engaging laterally or parallel to the bar axis YY and extending up to the cutting plane ZZ over the width of the cutting blade support 5 and into the cutting zone. The inner edge portion KE of member 70 is located very near to the cutting plane ZZ. This is of particular importance for preventing unnecessarily large waste during the end cutting of rolled billets and the like.

We claim:

1. Apparatus for cutting stock such as steel billets, comprising a machine frame, a cutting blade support assembly including a first, upper cutting blade support and a second, lower cutting blade support, pivotally connected to each other about a working bearing defining a first pivot axis and each having at least one cutting blade, a support member rigidly connected to said machine frame, said cutting blade support assembly being pivotally connected to a free end of said support member about a second pivot axis, first power drive means connected to said machine frame and to said cutting blade support assembly for pivoting said cutting blade support assembly about said second pivot axis, second power drive means connected to one of said first and second cutting blade supports for pivoting said first and said second cutting blade supports relative to each other about said first pivot axis to effect a cutting movement, a hold-down member connected to said cutting blade support assembly and pivotally mounted about said first pivot axis, and third power drive means connected to said hold-down member and to one of said first or second cutting blade supports for pivoting said hold-down member about said first pivot axis relative to the one of said first or second cutting blade supports.

2. Apparatus as defined in claim 1, wherein said cutting blades define a cutting point therebetween, and wherein said cutting point and said first pivot axis are disposed laterally between said second pivot axis and the location at which said first power drive means is connected to said cutting blade support assembly.

3. Apparatus as defined in claim 2, wherein said second pivot axis, said cutting point, said first pivot axis, and the location at which said first power drive means is connected to said cutting blade support assembly lie substantially within one plane and wherein the location at which said second power drive means is connected to the one of said first and second cutting blade supports is spaced apart from said plane.

4. Apparatus as defined in claim 3, wherein said first power drive means is connected to said upper cutting blade support and includes means for positioning said cutting blade of said upper cutting blade support against an upper surface of the stock to be cut and means for preventing movement of said upper cutting blade support relative to said machine frame.

5. Apparatus as defined in claim 4, wherein said second power drive means is connected to said lower cutting blade support and includes means for positioning said cutting blade of said lower cutting blade support against a lower surface of the stock to be cut.

6. Apparatus as defined in claim 5, wherein said third power drive means is connected to said lower cutting blade support and includes means for pivotally positioning said hold-down member against an upper surface of the stock to be cut and means for preventing movement of said hold-down member relative to said lower cutting blade support during the cutting movement.

7. Apparatus as defined in claim 6, wherein said working bearing includes means for absorbing axial forces therein, including means for biasing apart said cutting blades in a generally axial direction and means for limiting separation of said cutting blades in the axial direction.

8. Apparatus as defined in claim 7 further including means for cooling said working bearing and said cutting blades.

9. Apparatus as defined in claim 6, wherein said working bearing includes means for absorbing axial forces therein, including means for biasing said cutting blades towards each other in a generally axial direction and means for maintaning a minimum separation of said cutting blades in the axial direction.

10. Apparatus as defined in claim 6, wherein said hold-down member includes a pressure member extending at least partially over the width of said lower cutting blade.

11. Apparatus as defined in claim 10, further including scale means for positioning said cutting blade in a desired position and clamping means for releasably locking said cutting blade in position relative to said upper cutting blade support.

12. Apparatus as defined in claim 11 wherein said cutting point and said first pivot axis are disposed laterally between said second pivot axis and the location at which said first power drive means is joined to said upper cutting blade support.

13. Apparatus as defined in claim 12, wherein said first power drive means includes means for positioning said cutting blade of said upper cutting blade support against an upper surface of the stock to be cut and means for preventing movement of said upper cutting blade support relative to said machine frame.

14. Apparatus as defined in claim 11 further including means for cooling said working bearing and said cutting blades.

15. Apparatus as defined in claim 11, wherein said hold-down member includes a pressure member extending at least partially over the width of said lower cutting blade.

16. Apparatus as defined in claim 11, further including scale means for positioning said cutting blade in a desired position and clamping means for releasably locking said cutting blade in position relative to said upper cutting blade support.

17. Apparatus as defined in claim 6, further including means for adjustably moving said cutting blade in said upper cutting blade support in the direction of the cutting movement for cutting stock of varying dimensions.

18. Apparatus for cutting bar-shaped stock such as steel billets, comprising a machine frame, a cutting blade support assembly including upper and lower cutting blade supports pivotally connected to each other about a working bearing defining a first pivot axis and each having at least one cutting point, said cutting blades defining therebetween a cutting point, said cutting blade support assembly being pivotally connected to said machine frame about a second pivot axis, said first and second pivot axes and said cutting point being substantially coplanar, said first and second pivot axes being spaced on opposite sides of said cutting point, first power drive means for pivoting said cutting blade support assembly about said second pivot axis, said first power drive means having a first end joined to said machine frame and a second end joined to said upper cutting blade support on an opposite side of said cutting point from said second pivot axis, second power drive means for pivoting said upper and lower cutting blade supports relative to each other about said first pivot axis to effect a cutting movement, said second power drive means having a first end joined to said upper cutting blade support at a location not coplanar with said first and second pivot axes and a second end joined to said lower cutting blade support, a hold-down member pivotally joined to said cutting blade support assembly at said first pivot axis, third power drive means having a first end joined to said lower cutting blade support and a second end joined to said hold-down member, locking means for locking said hold-down member in position relative to said lower cutting blade support during the cutting movement, said cutting blade in said uppoer cutting blade support being adjustable relative to said upper cutting blade support in the direction of the cutting movement of said upper cutting blade support for cutting stock of varying dimensions, said working bearing having means for absorbing axial forces therein, including means for biasing apart said cutting blade supports and thereby said cutting blades in a direction substantially parallel to said first pivot axis and stop means for limiting separation of said cutting blades in said direction.

19. Apparatus as defined in claim 18, wherein all of said second pivot axis, said cutting point, said first pivot axis, and the location at which said first power drive means is connected to said cutting blade support assembly lie at least approximately within one plane, and wherein the location at which said second power drive means is connected to said lower cutting blade support is spaced apart from said plane.

20. Apparatus as defined in claim 19, wherein said second power drive means support and includes means for positioning said cutting blade of said lower cutting blade support against a lower surface of the stock to be cut prior to effecting the cutting movement.

* * * * *